United States Patent
Iwata

(10) Patent No.: US 7,249,394 B2
(45) Date of Patent: Jul. 31, 2007

(54) VEHICULAR WIPER DEVICE HAVING MOTOR AND INTERNAL SPACE

(75) Inventor: Kengo Iwata, Iwata-gun (JP)

(73) Assignee: ASMO CO., LTD., Shizuoka-pref. (JP)

( * ) Notice: Subject to any disclaimer, the term of this patent is extended or adjusted under 35 U.S.C. 154(b) by 470 days.

(21) Appl. No.: 10/983,667

(22) Filed: Nov. 9, 2004

(65) Prior Publication Data

US 2005/0097700 A1    May 12, 2005

(30) Foreign Application Priority Data

Nov. 11, 2003    (JP) .............................. 2003-381141

(51) Int. Cl.
   *B60S 1/24*    (2006.01)
   *B60S 1/18*    (2006.01)
(52) U.S. Cl. ............... 15/250.27; 15/250.3; 15/250.31; 296/96.17; 74/42
(58) Field of Classification Search ............... 15/250.3, 15/250.31, 250.27, 250.351, 250.352; 74/42, 74/43; 296/96.17
   See application file for complete search history.

(56) References Cited

U.S. PATENT DOCUMENTS 5,261,286 A * 11/1993 Hayashi ..................... 74/96
6,209,373 B1 * 4/2001 Muehlpforte et al. .......... 72/58
6,675,431 B1 * 1/2004 Rachui et al. ............. 15/250.3
2002/0083544 A1   7/2002 Masuda
2004/0034959 A1   2/2004 Nakamura

FOREIGN PATENT DOCUMENTS

EP         0684170         * 5/1995

* cited by examiner

*Primary Examiner*—Gary K. Graham
(74) *Attorney, Agent, or Firm*—Posz Law Group, PLC

(57) ABSTRACT

A vehicular wiper device includes a wiper motor secured to a crank arm, a first pivot holder rotatably supporting a wiper arm and a first pivot lever, a second pivot holder rotatably supporting a wiper arm and a second pivot lever, and a link structure connected to the crank arm. Rotation power of the wiper motor is transmitted to the first pivot lever and the second pivot lever via the crank arm and the link structure. The wiper motor is secured to a rear face of a motor bracket portion of the first pivot holder on an opposite side as the wiper arm with respect to the motor bracket portion. The crank arm is arranged on the opposite side as the wiper motor with respect to the motor bracket portion. A dimension between the rear face of the motor bracket portion and the first pivot lever is set to be greater than a dimension between the rear face of the motor bracket portion and the crank arm.

9 Claims, 7 Drawing Sheets

VEHICULAR WIPER DEVICE HAVING MOTOR AND INTERNAL SPACE

CROSS REFERENCE TO RELATED APPLICATIONS

This application is based on and incorporates herein by reference Japanese Patent Application No. 2003-381141 filed on Nov. 11, 2003.

FIELD OF THE INVENTION

The present invention relates to a vehicular wiper device that wipes a window of a vehicle.

BACKGROUND OF THE INVENTION

According to JP-A-2002-200969, an impact absorbing structure is constructed in a conventional vehicular wiper device. The wiper device has a fixing portion, to which a wiper arm is secured, and the fixing portion includes a fragile part. The fragile part is broken and the wiper motor is separated from a wiper frame at the fragile part, when impact is applied to the wiper motor from the outside of the vehicle. In this situation, the wiper motor is moved to the inside of the vehicle, and impact applied to the wiper motor is absorbed by the wiper device.

However, the fixing portion may be weakened due to the fragile part in the conventional structure, and the fragile part may be broken when a high load is applied to the fragile part while the wiper device wipes accumulated snow. On the contrary, when the fragile part is excessively strengthened, impact absorption structure cannot be properly constructed.

Furthermore, when a colliding object (object to be protected) collides against the wiper motor, and impact force is applied to the wiper motor from the outside, the impact force may be absorbed by a vehicular body (collided object). However, a large impact is applied to the colliding object (object to be protected) when the colliding object (object to be protected) collides against a hard massive object such as a wiper motor. In this situation, impact applied to the colliding object (object to be protected) may not be sufficiently absorbed.

Specifically, a wiper motor is located on the upper side of a motor bracket portion, and an output shaft penetrates through the motor bracket portion in a conventional wiper device according to JP-A-2002-200969. A crank arm is located on the lower side of the wiper motor to move a link structure of the wiper. In this structure, the wiper motor is in the vicinity of a fixing portion, in which the wiper device is secured to the vehicular body, in a height (vertical) direction. The fixing portion is a part of a pivot holder that has a rotation axis of the wiper. Therefore, distance between the wiper motor and the vehicular body becomes small. An engine hood deforms when the colliding object (object to be protected) collides against the engine hood. In this structure, deformed portion of the engine hood reaches at the wiper motor immediately after starting of deformation of the engine hood, and effect of impact absorption cannot be sufficiently achieved by deformation of the vehicular body.

SUMMARY OF THE INVENTION

In view of the foregoing problems, it is an object of the present invention to produce a vehicular wiper device that has a structure, in which impact applied to a wiper motor can be reduced, and impact applied to a colliding object (object to be protected) can be reduced, as well as absorbing impact applied to a collided object (vehicle) when a collision occurs in the vehicle.

According to the present invention, a vehicular wiper device includes a wiper motor, a crank arm, a first pivot holder, a first pivot lever, a second pivot holder, a second pivot lever, and a link structure. The wiper motor has an output shaft. The crank arm is secured to the output shaft. The first pivot holder is secured to a vehicular body. The first pivot holder rotatably supports a first pivot shaft, in which one axial end of the first pivot shaft is secured to a wiper arm. The first pivot lever is secured to the other one of the axial end of the first pivot shaft. The second pivot holder is secured to the vehicular body. The second pivot holder rotatably supports a second pivot shaft, in which one axial end of the second pivot shaft is secured to a wiper arm.

The second pivot lever is secured to the other one of the axial end of the second pivot shaft. The link structure connects among the crank arm, the first pivot lever and the second pivot lever to transmit rotation power of the wiper motor to the first pivot shaft and the second pivot shaft as a back-and-forth motion.

The first pivot holder has a motor bracket portion, to which the wiper motor is secured. The wiper motor is arranged on a side of a rear face of the motor bracket portion that is on a substantially opposite side as the wiper arm with respect to the motor bracket portion. The crank arm is arranged on a frontside of the motor bracket portion that is on a substantially opposite side as the wiper motor with respect to the motor bracket portion. The rear face of the motor bracket portion and the first pivot lever of the first pivot shaft are spaced from each other by a distance that is greater than a distance between the rear face of the motor bracket portion and the crank arm in a substantially axial direction of the first pivot shaft.

Alternatively, the first pivot holder further includes a first bearing portion, and a tower portion. The first bearing portion rotatably supports the first pivot shaft. The tower portion extends from a side of the first pivot lever of the first bearing portion to a side of the first pivot lever with respect to the first bearing portion. The motor bracket portion continuously extends from the tower portion such that the wiper motor is secured to the motor bracket portion. The wiper motor is arranged on a side of a rear face of the motor bracket portion that is on an opposite side as the first bearing portion with respect to the motor bracket portion. The output shaft penetrates the motor bracket portion, so that the crank arm, which is secured to the output shaft, is arranged on a frontside of the motor bracket portion that is on the side of the first bearing portion.

Alternatively, the vehicular wiper device further includes a frame member that connects the first pivot holder and the second pivot holder with each other. The motor bracket portion connects with the second pivot holder via the frame member.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
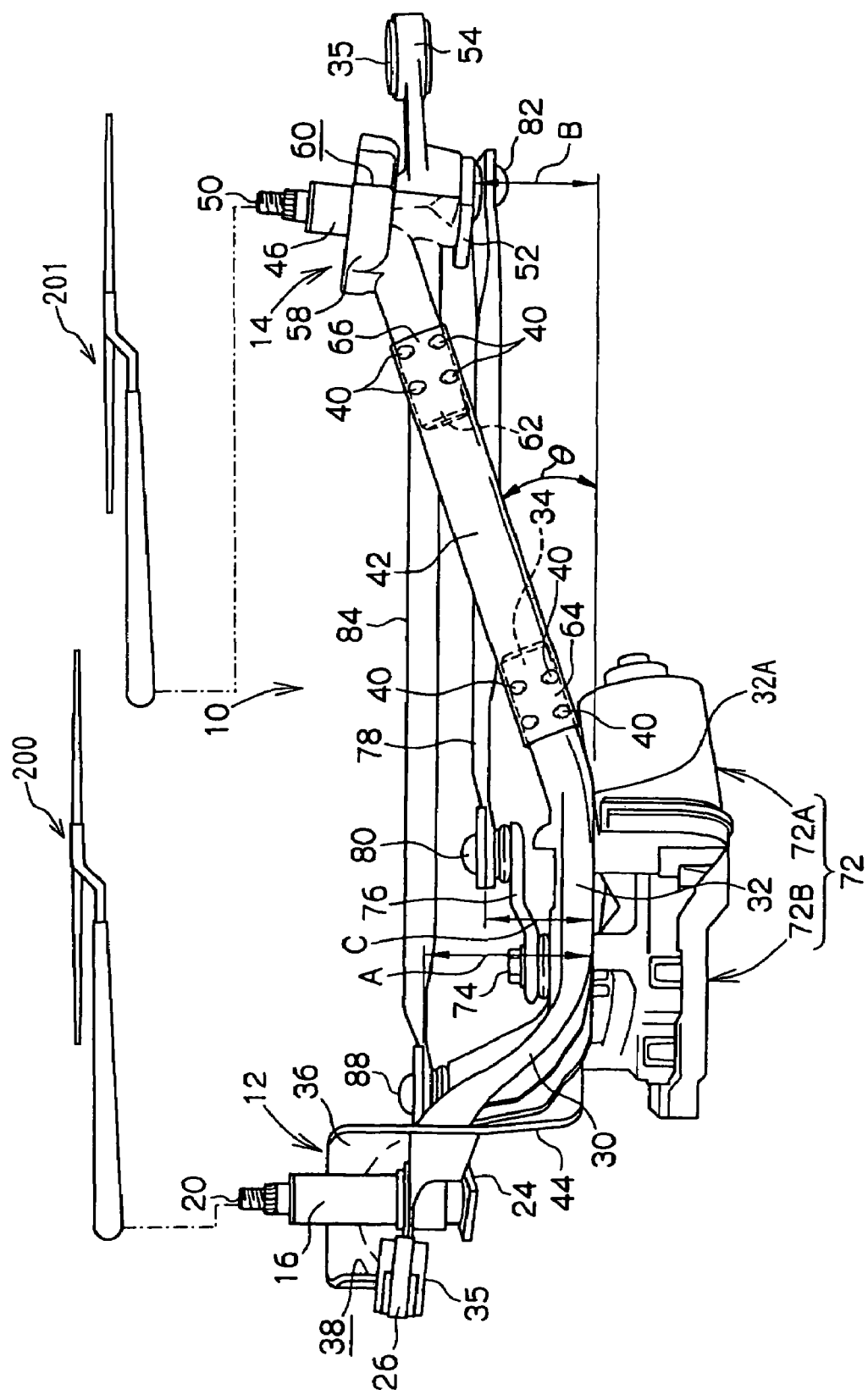
FIG. 1 is a side view showing a wiper device according to a first embodiment of the present invention.
Figure 2:
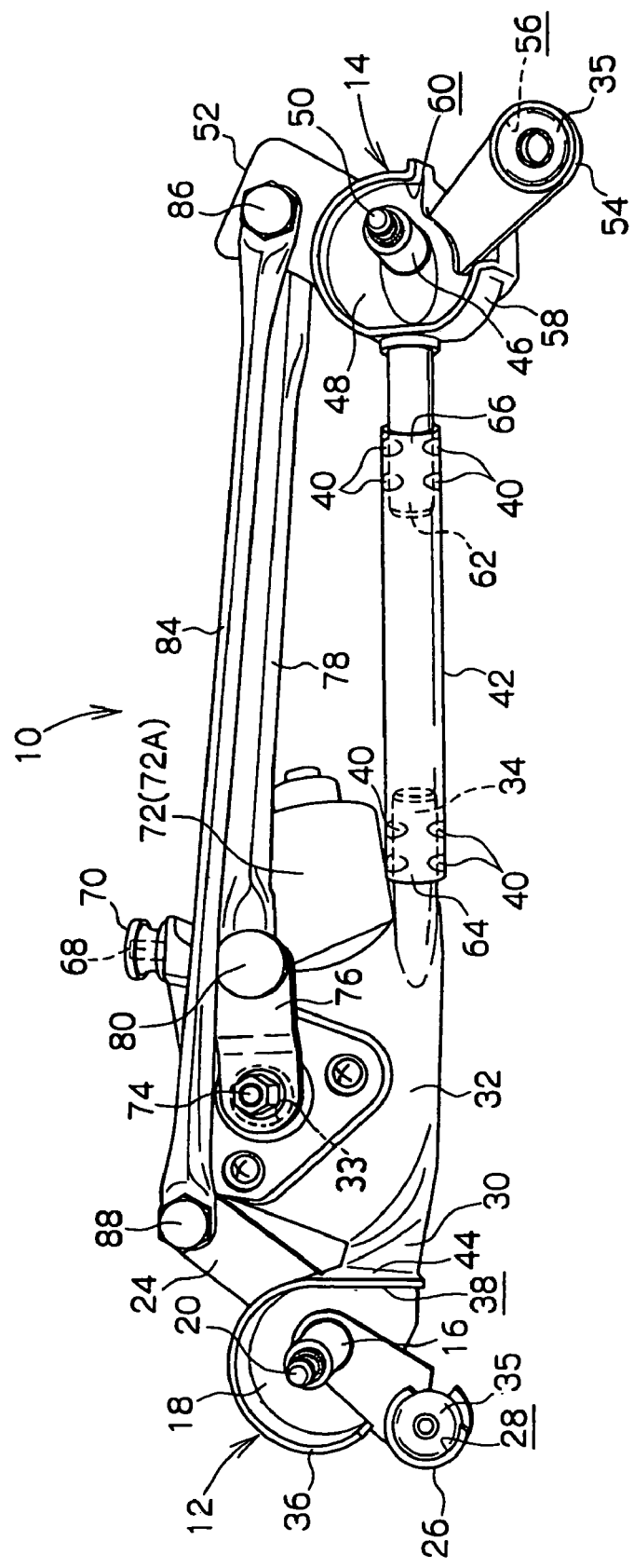
FIG. 2 is a top view showing the wiper device according to the first embodiment.

As shown in FIGS. 1 and 2, a wiper device 10 includes a first pivot holder 12 and a second pivot holder 14. The first pivot holder 12 and the second pivot holder 14 construct a substantially symmetrical structure of the wiper device 10, and have a substantially same construction.

The first pivot holder 12 and the second pivot holder 14 are formed of a metallic material such as aluminum alloy die-cast. The first pivot holder 12 is integrally formed of a first bearing portion 16 and a flange 18 (FIG. 1). The first bearing portion 16 is formed in a cylindrical shape, through which a first pivot shaft 20 is inserted, so that the first bearing portion 16 rotatably supports the first pivot shaft 20. A first pivot lever 24 is secured to a lower end portion of the first pivot shaft 20, so that the first pivot shaft 20 can be rotated corresponding to a back-and-forth motion (reciprocating motion) of the first pivot lever 24.

The first pivot holder 12 has a first fixing portion 26 that radially extends from the first bearing portion 16 such that the first fixing portion 26 is located on a corner of the flange 18 on a substantially opposite side as the direction, in which the first pivot lever 24 extends. The first fixing portion 26 has a mounting hole 28, in which a rubber grommet 35 is provided. A mounting bolt (not shown) is inserted into the rubber grommet 35, so that the first pivot holder 12 of the wiper device 10 is screwed to a vehicular body.

The first pivot holder 12 has a tower portion 30, which extends to the side of the first pivot lever 24 with respect to the first bearing portion 16. That is, the tower portion 30 extends into an internal space of the vehicular body substantially along the axial direction of the first pivot shaft 20 as shown in FIG. 1.

Specifically, the tower portion 30 continuously, i.e. integrally extends from the first bearing portion 16 of the first pivot holder 12 via the flange 18 of the first pivot holder 12, which extends in the radial direction of the first pivot shaft 20 into the vehicular body from the upper side to the lower side in FIG. 1. That is, the tower portion 30 extends substantially in the vertical direction, i.e., substantially along the axial direction of the first pivot shaft 20, so that a wiper motor 72 is spaced from the vehicular body via the tower portion 30. Specifically, a motor bracket portion 32, which serves as a mounting base of the wiper motor 72, is spaced from an engine rid (engine hood) of the vehicular body via the tower portion 30. The motor bracket portion 32 is integrally formed with the tower portion 30, such that the motor bracket portion 32 extends from one end of the tower portion 30 on the opposite side as the first pivot holder 12. The motor bracket portion 32 is formed in a flat shape, such that a flat plane of the motor bracket portion 32 is substantially parallel to a imaginary flat plane, in which a crank arm 76 of the wiper motor 72 performs a back-and-forth motion.

A plane, which includes the flat plane of the motor bracket portion 32, and the axis of the first pivot shaft 20 cross each other. Specifically, the plane, which includes the flat plane of the motor bracket portion 32, is substantially perpendicular to the axis of the first pivot shaft 20.

That is, the flat plane of the motor bracket portion 32 is substantially parallel to an imaginary flat plane, in which a first link rod 78 and a second link rod 84 moves, such that the first link rod 78 and the second link rod 84 performs a back-and-forth motion (reciprocating motion).

The wiper motor 72 is secured to a rear face 32A of the motor bracket portion 32, i.e., on the opposite side as the first bearing portion 16 with respect to the motor bracket portion 32. That is, the wiper motor 72 is secured to the motor bracket portion 32 on the lower side in FIG. 1, i.e., on the backside in FIG. 2. The motor bracket portion 32 has a first connecting portion 34 that extends from the motor bracket portion 32. The first connecting portion 34 is inclined by angle θ (FIG. 1) with respect to a mounting plane, to which the wiper motor 72 is mounted to the frontside of the motor bracket portion 32. That is, the first connecting portion 34 extends from the backside of the motor bracket portion 32 to the frontside of the motor bracket portion 32. The first connecting portion 34 is a solid member such as a round shaft having a substantially circular cross section. The first connecting portion 34 defines recessions 40. The first connecting portion 34 is connected to one axial end of a frame member 42. Here, the first connecting portion 34 may be a hollow shaft having an annular cross section.

Figure 3:
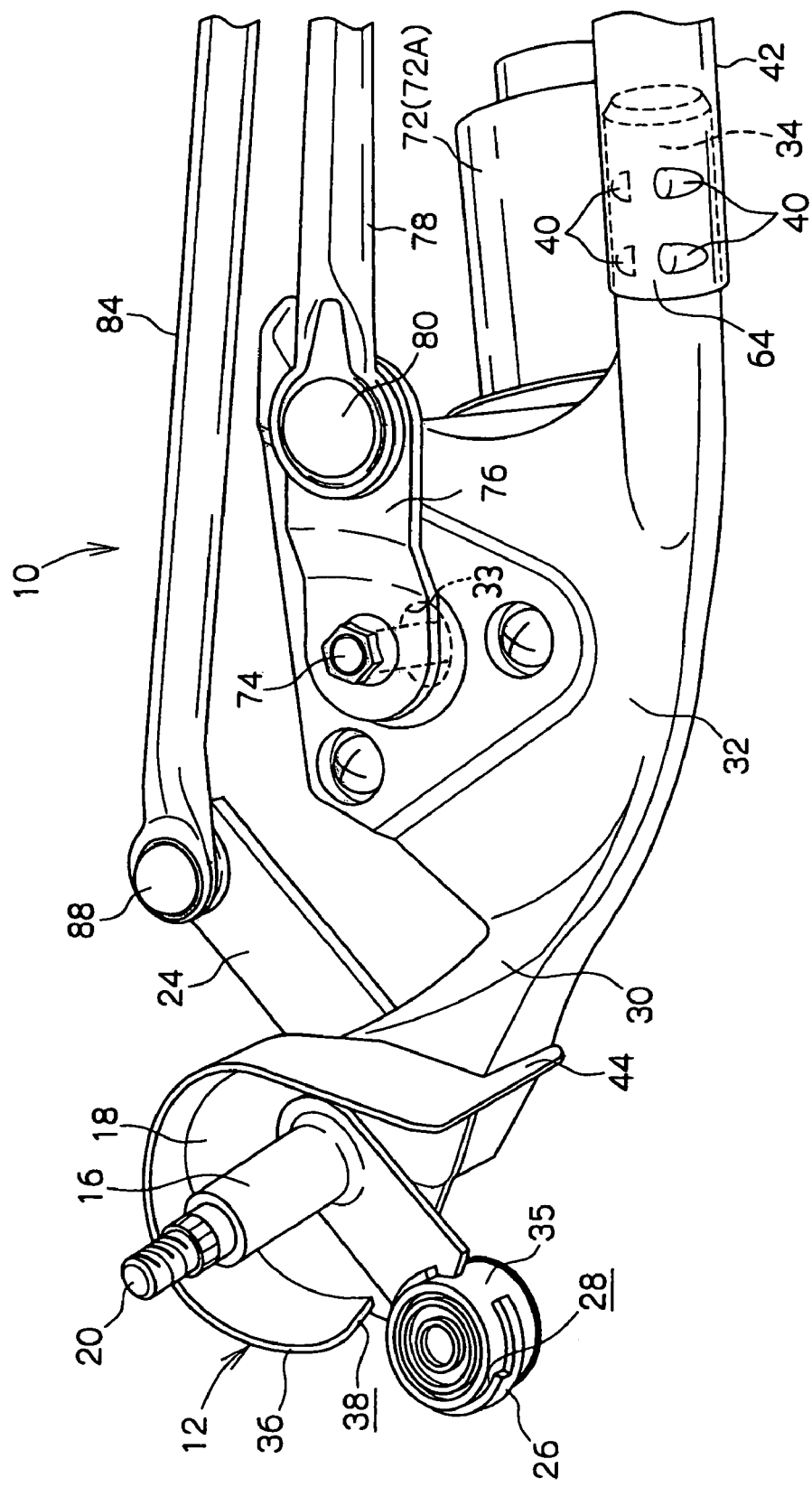
FIG. 3 is an enlarged perspective view showing a first pivot holder of the wiper device according to the first embodiment.

As shown in FIG. 3, the first pivot holder 12 has a circumferential wall 36 that surrounds the first bearing portion 16 with a predetermined circumferential space. The circumferential wall 36 has a notch (opening) 38 that partially opens in the circumferential wall 36 on the side of the first fixing portion 26, i.e., on the substantially opposite side as the direction in which the first pivot lever 24 extends. The circumferential wall 36 has a vertical wall 44 that extends from the lower end of the circumferential wall 36 on the side of the tower portion 30. Specifically, the vertical wall 44 integrally extends from the notch 38 of the circumferential wall 36 substantially in a vertical direction, i.e., substantially along a plumb line. Thus, the vertical wall 44 horizontally partitions between a space defined by the circumferential wall 36 and the side of the tower portion 30.

The second pivot holder 14 is integrally formed of a second bearing portion 46 and a flange 48. The second bearing portion 46 is formed in a cylindrical shape, through which a second pivot shaft 50 is inserted, so that the second bearing portion 46 rotatably supports the second pivot shaft 50. A second pivot lever 52 is secured to a lower end portion of the second pivot shaft 50, so that the second pivot shaft 50 can be can be rotated corresponding to a back-and-forth motion (reciprocating motion) of the second pivot lever 52.

The second pivot holder 14 has a second fixing portion 54 that radially extends from the second bearing portion 46 such that the second fixing portion 54 is located on a corner of the flange 48 on a substantially opposite side as the direction, in which the second pivot lever 52 extends. The second fixing portion 54 has a mounting hole 56, in which a rubber grommet 35 is provided. A mounting bolt (not shown) is inserted into the rubber grommet 35, so that the second pivot holder 14 of the wiper device 10 is screwed to a vehicular body.

The second pivot holder 14 has a circumferential wall 58 as same as the first pivot holder 12. The circumferential wall 58 surrounds the second bearing portion 46 with a predetermined circumferential space. The circumferential wall 58 has a notch 60 that partially opens in the circumferential wall 58 on the side of the second fixing portion 54, i.e., on the substantially opposite side as the direction in which the second pivot lever 52 extends.

The second pivot holder 14 has a second connecting portion 62 that extends to the first pivot holder 12. The second connecting portion 62 is a solid member such as a round shaft having a substantially circular cross section. The second connecting portion 62 defines recessions 40. The second connecting portion 62 is connected to the other axial end of the frame member 42 on the axially opposite side as the first connecting portion 34. Here, the second connecting portion 62 may be a hollow shaft having an annular cross section.

The frame member 42 is formed of a deformable (plastically deformable) metal in a bar-shape, so that the frame member 42 can be crimped. The frame member 42 is not bent in its forming process, i.e., the frame member 42 is a substantially straight member. One longitudinally end of the frame member 42 is a first connected portion 64 that is connected with the first connecting portion 34 of the first pivot holder 12. The other longitudinally end of the frame member 42 is a second connected portion 66 that is connected with the second connecting portion 62 of the second pivot holder 14. The first and second connected portions 64, 66 of the frame member 42 are formed in a cylindrical shape, so that the first connected portion 64 fits to the first connecting portion 34 and the second connected portion 66 fits to the second connecting portion 62. In this situation, the connected portions 64, 66 are crimped at the recessions 40, so that the first connected portion 64 is secured to the first connecting portion 34, and the second connected portion 66 is secured to the second connecting portion 62. Thus, the first and the second connecting portions 34, 62 are connected with each other via the frame member 42, so that the first and the second pivot holders 12, 14 are connected with each other via the frame member 42 to be an integrated member, i.e., integrated module.

A positioning pin 68 is provided to the backside of the motor bracket portion 32 of the first pivot holder 12, such that the positioning pin 68 protrudes to the backside of the motor bracket portion 32, i.e., to the backside in FIG. 1, or to the upper side in FIG. 2. An elastic grommet 70 is provided around the positioning pin 68 to support the positioning pin 68. A positioning hole (not shown) is defined in the vehicular body. The grommet 70 receiving the positioning pin 68 fits to the positioning hole of the vehicular body, so that the wiper device 10 can be positioned with respect to the vehicular body and supported by the vehicular body. That is, the positioning hole of the vehicular body defines a standard position on the vehicular side, so that the wiper device 10 can be easily positioned and supported by the vehicular body in the same manner as that of a wiper motor 72 that integrally has a supporting pin. However, in this structure, in which the positioning pin 68 and the grommet 70 are additionally provided to the motor bracket portion 32, positioning and supporting of the wiper device 10 can be easily performed without being affected by a mounting position of the wiper motor 72 with respect to the motor bracket portion 32.

The wiper motor 72 serving as a power source is mounted to the motor bracket portion 32 of the second pivot holder 12 that is connected to the frame member 42. The wiper motor 72 is constructed of a motor portion 72A and a gear portion 72B. The wiper motor 72 is provided to the rear face (backside) 32A of the motor bracket portion 32 that is on the opposite side as the first bearing portion 16. That is, the wiper motor 72 is arranged on the internal side of the vehicular body with respect to the motor bracket portion 32. The wiper motor 72 has an output shaft 74 that penetrates a through hole 33 (FIG. 2) formed in the motor bracket portion 32, such that the output shaft 74 protrudes to the frontside of the motor bracket portion 32 on the side of the first bearing portion 16, i.e., on the upper side in FIG. 1, on the frontside in FIG. 2. The crank arm 76 is secured to an axial end of the output shaft 74. One end of the crank arm 76 is connected with one end of the first link rod 78, which constructs a link structure, via a ball joint 80.

The other end of the first link rod 78 is movably connected with the second pivot lever 52 of the second pivot shaft 50 via a ball joint 82 (FIG.1). The second pivot lever 52 of the second pivot shaft 50 is rotatably supported by the second pivot holder 14. The second pivot lever 52 is movably connected with one end of the second link rod 84 via a ball joint 86. The second link rod 84 constructs the link structure. The other end of the second link rod 84 is connected with the first pivot lever 24 of the first pivot shaft 20 that is rotatably supported by the second pivot holder 12. Thus, the wiper motor 72 rotates the crank arm 76, such that driving power is transmitted via the first link rod 78 and the second pivot lever 52, so that the second pivot shaft 50 rotates. Simultaneously, the driving power is transmitted via the second pivot lever 52, the second link rod 84 and the first pivot lever 24, so that the first pivot shaft 20 rotates.

As shown in FIG. 1, a dimension B is a distance between the rear face 32A of the motor bracket portion 32 of the first pivot holder 12, i.e., the mounting face of the wiper motor 72 and the second pivot lever 52 of the second pivot shaft 50. A dimension C is a distance between the rear face 32A of the motor bracket portion 32 and the crank arm 76. Here, the dimension B is set to be greater than the dimension C. A dimension A is a distance between the rear face 32A of the motor bracket portion 32 and the first pivot lever 24 of the first pivot shaft 20. Specifically, the dimension A is a distance between the rear face 32A of the motor bracket portion 32 and a connecting portion, in which the first pivot lever 24 is connected with of the second link rod 84. The dimension A is set to be greater than the dimension B. That is, the rear face 32A of the motor bracket portion 32 and the first pivot lever 24 are spaced by the dimension A via the tower portion 30.

Thus, both the wiper motor 72 and the motor bracket portion 32 are spaced from the vehicular body via the tower portion 30. Preferably, the height of the tower portion 30 is predetermined such that the distance between the wiper motor 72 and the vehicular body, e.g., engine hood, can be maintained greater than 10 cm to achieve an effect of impact absorption that is obtained by deformation of the vehicular body.

Wiper arms and wiper blades 200, 201 are respectively secured to the axial ends of the first pivot shaft 20 and the second pivot shaft 50. The first pivot shaft 20 and the second pivot shaft 50 respectively rotate, so that the wiper arms and the wiper blades 200, 201 respectively perform a back-and-forth motion (reciprocating motion) in a limited motion range.

Next, operation of the wiper device 10 is described.

The first and second pivot holders 12, 14, which rotatably support respectively the first and second pivot shafts 20, 50, are connected with each other via the frame member 42 in the wiper device 10. The wiper motor 72 is directly secured to the motor bracket portion 32 of the first pivot holder 12, so that an assembly structure, i.e., assembly module is constructed.

The positioning pin 68 and the grommet 70 provided to the motor bracket portion 32 are inserted into the positioning hole that defines the standard position on the vehicular side, so that the motor bracket portion 32 is positioned with respect to the vehicular body. The mounting bolts are inserted into the rubber grommets 35, which are respectively provided in the mounting holes 28, 56 of the first and second pivot holders 12, 14, so that the first and second pivot holders 12, 14 of the wiper device 10 are screwed to the vehicular body via the rubber grommets 35. Thus, the first and second pivot holders 12, 14 are secured to a lower portion with respect to a windshield of the vehicular body, such that the wiper device 10 is mounted in the vehicular body to construct a floating structure, in which the wiper device 10 is spaced from the vehicular body, specifically engine hood. The wiper motor 72 rotates the first and second pivot shafts 20, 50, so that the wiper arms and the wiper blades 200, 201 respectively perform the back-and-forth motion in the limited motion range to wipe raindrops adhering on the windshield.

The wiper motor 72 is arranged on the rear face 32A of the motor bracket portion 32, i.e., on the vertically opposite side as the first bearing portion 16 and the wiper arm, with respect to the motor bracket portion 32. The output shaft 74 of the wiper motor 72 penetrates the through hole 33 formed in the motor bracket portion 32, and the crank arm 76 is arranged on the frontside, i.e., front face side of the motor bracket portion 32, i.e., vertically on the side of the first bearing portion 16 and the wiper arm in the wiper device 10. The dimension A between the rear face 32A of the motor bracket portion 32 and the first pivot lever 24 of the first pivot shaft 20 is set to be greater than the dimension C between the rear face 32A of the motor bracket portion 32 and the crank arm 76.

That is, the motor bracket portion 32 connects to the tower portion 30, which extends to the side of the first pivot lever 24 with respect to the first bearing portion 16. The motor bracket portion 32 is positioned on the internal side of the vehicular body with respect to the first bearing portion 16, i.e., on the lower side in FIG. 1. Thus, a distance between the wiper motor 72 and a portion of the vehicular body, e.g. engine hood located on the upper side of the wiper motor 72 can be secured.

Besides, the wiper motor 72 is arranged on the backside of the motor bracket portion 32. Therefore, a distance between the vehicular body and the wiper motor 72 can be sufficiently secured, while the end of the first pivot shaft 20, to which the wiper arm is secured, protrudes from the vehicular body on the vertically opposite side as the wiper motor 72.

Therefore, a distance, in which a colliding object (object to be protected) reaches at the wiper motor 72 in the case of collision of the vehicle, can be sufficiently secured. Thus, the effect of impact absorption, which is obtained by deformation of the vehicular body, can be sufficiently achieved, so that impact load, which is applied to the wiper motor 72 and a peripheral portion of the wiper motor 72, can be sufficiently reduced. Furthermore, impact, which is applied to the colliding object (object to be protected), can be reduced.

The dimension A between the rear face 32A of the motor bracket portion 32 and the first pivot lever 24 of the first pivot shaft 20 is set to be greater than the dimension C between the rear face 32A of the motor bracket portion 32 and the crank arm 76. Therefore, the components of the wiper device 10 can be separately arranged in the axial direction of the first pivot shaft 20, i.e., vertical direction, such that interference among the components can be evaded when the wiper motor 72 is operated. Specifically, interference between the first pivot lever 24 of the first pivot shaft 20 and the crank arm 76 can be evaded. Furthermore, interference between the link structure such as the first link rod 78 connected to the crank arm 76 and the second link rod 84 connected to the first pivot lever 24 can be evaded.

The components of the wiper device 10 are separated from each other in the horizontal direction that is perpendicular to the axial direction of the first pivot shaft 20 to evade interference among the components such as the link structure in the wiper device 10.

On the contrary in a general structure, a large motor bracket portion is needed to form a large space between a mounting position of the wiper motor 72 and components of the wiper device 10 such that the link rods and the pivot levers are not located in a movable range of the crank arm 76. However, the motor bracket portion 32 of the wiper device 10 can be reduced in size and weight compared with the motor bracket portion of the general structure.

Furthermore, the height from the rear face 32A of the motor bracket portion 32 to the crank arm 76, the height from the rear face 32A of the motor bracket portion 32 to the second pivot lever 52 of the second pivot shaft 50, and the height from the rear face 32A of the motor bracket portion 32 to the first pivot lever 24 of the first pivot shaft 20 are respectively different from each other in the wiper device 10. That is, a movable area of the first link rod 78 and a movable area of the second link rod 84 are vertically separated from each other in the axial direction of the first pivot shaft 20 (height direction), so that interference between the first link rod 78 and the second link rod 84 can be evaded.

An area occupied by the wiper device 10 can be reduced in the longitudinal direction of the wiper device 10 and in the longitudinal direction of the vehicle, i.e., a direction perpendicular to the axial direction of the first pivot shaft 20. Besides, the first and second link rods 78, 84 are not bent in the manufacturing process, therefore buckling strength of the first and second link rods 78, 84 can be maintained even the first and second link rods 78, 84 are elongated members.

The first connecting portion 34 protrudes from the motor bracket portion 32 of the first pivot holder 12 such that the first connecting portion 34 is inclined by the angle θ with respect to the mounting plane of the wiper motor 72 in the wiper device 10. The second connecting portion 62 is provided to the second pivot holder 14 that is connected with the first connecting portion 34 via the frame member 42 having a cover shape. Thus, a wiper module having a frame-integrated structure is constructed.

The first connecting portion 34 of the motor bracket portion 32 is inclined by the angle θ on the frontside, i.e., on the upper side in FIG. 1 of the motor bracket portion 32 with respect to the mounting plane of the wiper motor 72. Therefore, the motor bracket portion 32 can be spaced from the first and second pivot shafts 20, 50 substantially along the axial direction of the first pivot shaft 20, so that the motor bracket portion 32 can be arranged in an internally deep portion of the vehicular body.

Furthermore, the frame member 42 connecting between the first connecting portion 34 and the second connecting portion 62 has a simple bar shape, so that the frame member 42 need not to be bent in the manufacturing process. Therefore, buckling strength of the frame member 42 can be enhanced.

The wiper arms and the wiper blades 200, 201, which are secured to the axial ends of the pivot shafts 20, 50, are used to wipe a surface of a window such as the windshield in the wiper device 10. Therefore, the ends of the pivot shafts 20, 50 need to be protruded from the vehicular body to the outside. The first and second pivot holders 12, 14 are secured to the vehicular body via the first and second fixing portions 26, 54 respectively extending from the first and second bearing portions 16, 46 in the radial direction of the bearing portions 16, 46 in the wiper device 10. Therefore, the bearing portions 16, 46, which rotatably support the first and second pivot shafts 20, 50, can be arranged in the vicinity of the vehicular body. That is, the wiper device 10 is secured to the vehicular body via the first fixing portion 26, which is close to the first bearing portion 16, and the second fixing portion 54, which is close to the second bearing portion 46. Therefore, the motor bracket portion 32 is arranged on the internal side of the vehicular body with respect to the bearing portions 16, 46, and the motor bracket portion 32 can be spaced from the outside of the vehicular body by the tower portion 30. Thus, the distance between the vehicular body and the wiper motor 72 can be sufficiently secured, while the first and second pivot shafts 20, 50 protrude from the vehicular body to the outside.

Furthermore, the wiper device 10 is secured to the vehicular body via the fixing portions 26, 54, so that mounting position of the first and second pivot shafts 20, 50 of the wiper device 10, which serve as rotation shafts of the wiper arms, can be precisely stabilized.

Furthermore, water such as raindrop and cleaning water of the vehicle may intrude through a pivot hole, through which the first pivot shaft 20 penetrates. Here, the pivot hole may be formed in the engine hood of the vehicular body. When water intrudes into the vehicular body, the water may flow into a liking portion, which links between the first pivot lever 24 and the link structure, e.g., the second link rod 84, and lubricant grease included in the link structure may flow out of the link structure. As a result, abrasion may be caused in the link structure. However, in the wiper device 10, water such as raindrop can be caught by the circumferential wall 36 that surrounds the first bearing portion 16, and the water can be drained from the notch 38 that partially opens in the circumferential wall 36 on the substantially opposite side as the direction in which the first pivot lever 24 extends. Thus, water can be restricted from flowing into the link structure in the above structure, so that the link structure can be protected from causing abrasion.

The vertical wall 44 continuously extends from the circumferential wall 36 to the lower side in FIG. 1. Specifically, the vertical wall 44 extends from the notch 38 of the circumferential wall 36 substantially in the vertical direction. Therefore, even when water intrudes through the pivot hole, and the water is caught by the circumferential wall 36, the water can be restricted from flowing into another portion, such as the wiper motor 72 introduced by the tower portion 30.

In this structure of the wiper device 10, impact applied to a collided object (vehicle), can be absorbed in the case in which a collision occurs to the vehicle. Furthermore, impact load, which is applied to the wiper motor, can be sufficiently reduced when a collision occurs to the vehicle. Furthermore, impact, which is applied to the colliding object (object to be protected), can be also reduced. Besides, the wiper device can be reduced in size and weight.

Second Embodiment

Figure 4:
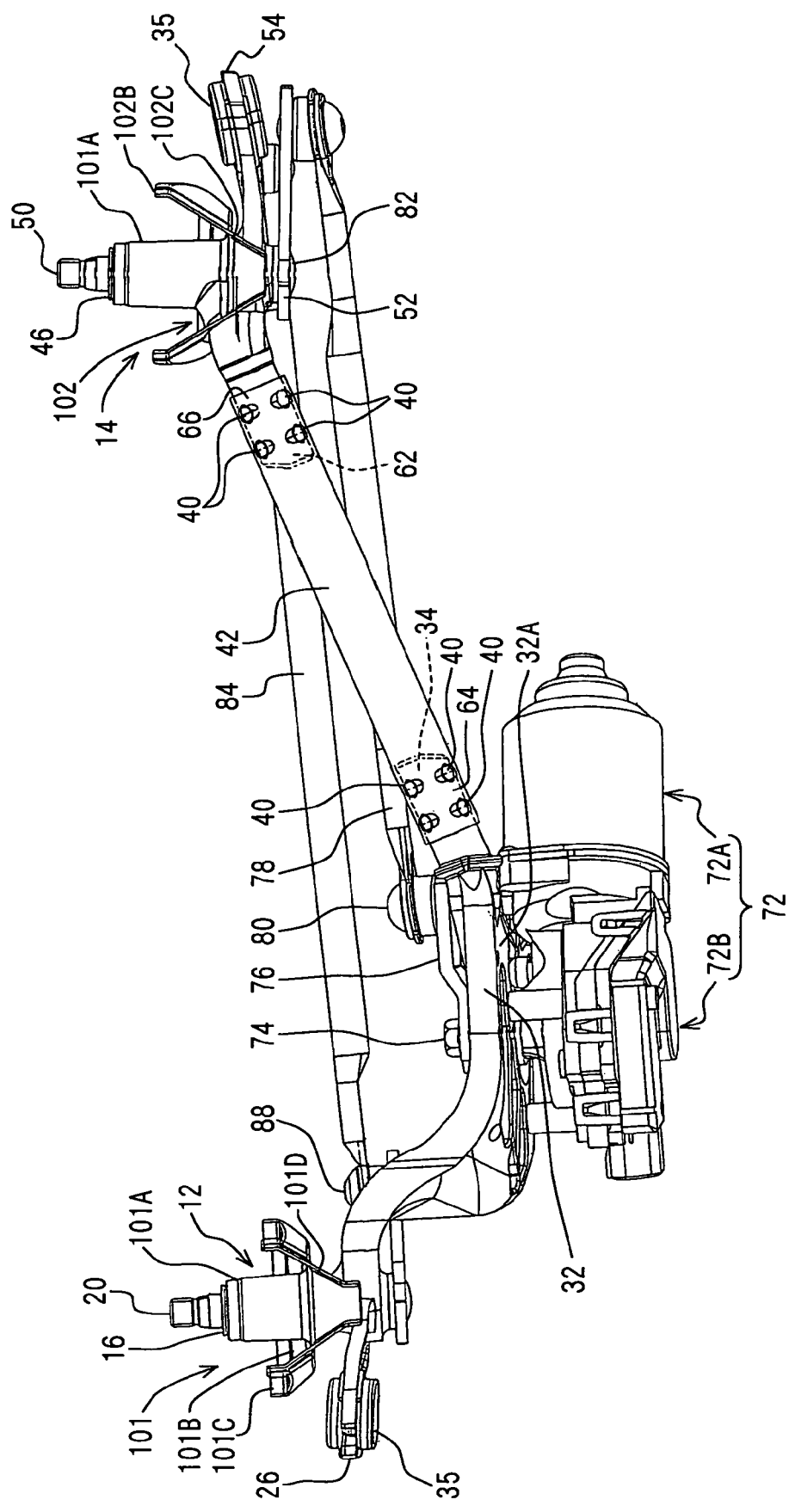
FIG. 4 is a side view showing a wiper device according to a second embodiment of the present invention.
Figure 5:
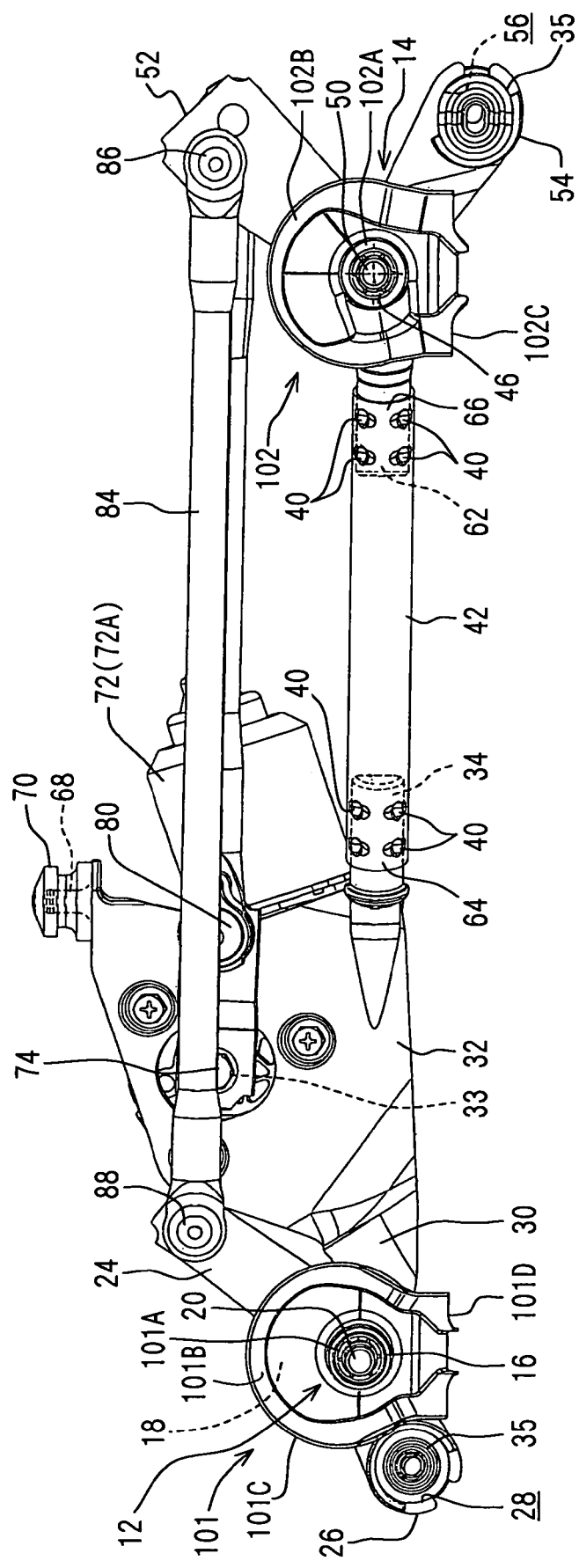
FIG. 5 is a top view showing the wiper device according to the second embodiment.

As shown in FIGS. 4 and 5, a first water cap 101 is provided to the first pivot holder 12, and a second water cap 102 is provided to the second pivot holder 14 of the wiper device 10.

The first water cap 101 is constructed of a cylindrical portion 101A, a circumferential wall portion 101B and an outer circumferential portion 101C. The cylindrical portion 101A is attached to the outer circumferential periphery of the first bearing portion 16 along the axial direction of the first pivot shaft 20. The circumferential wall portion 101B extends from the cylindrical portion 101A in the radial direction of the cylindrical portion 101A. The outer circumferential portion 101C extends from a radially outer portion of the circumferential wall portion 101B substantially in the axial direction of the first pivot shaft 20. The circumferential wall portion 101B has a tub portion 101D that is an opening (notch), through which the inside of the circumferential wall portion 101B and the outside of the circumferential wall portion 101B are communicated with each other in the radial direction of the cylindrical portion 101A.

Similarly, the second water cap 102 is constructed of a cylindrical portion 102A, a circumferential wall portion 102B and an outer circumferential portion 102C. The cylindrical portion 102A is attached to the outer circumferential periphery of the second bearing portion 46 along the axial direction of the second pivot shaft 50. The circumferential wall portion 102B extends from the cylindrical portion 102A in the radial direction of the cylindrical portion 102A. The outer circumferential portion 102C extends from a radially outer portion of the circumferential wall portion 102B substantially in the axial direction of the second pivot shaft 50. The circumferential wall portion 102B has a tub portion 102D that is an opening (notch), through which the inside of the circumferential wall portion 102B and the outside of the circumferential wall portion 102B are communicated with each other in the radial direction of the cylindrical portion 102A.

In the wiper device 10 of this embodiment, water such as cleaning water and raindrop can be gathered by the first and second water caps 101, 102. The gathered water can be drained through the tub portions 101D, 102D that partially open in the circumferential wall portion 101B. Thus, water can be restricted from flowing to the link structure, even when water intrudes through the pivot holes to the inside of the vehicular body, so that the link structure can be protected from causing abrasion. Furthermore, the first and second water caps 101, 102 are separated from the first and second pivot holders 12, 14. That is, the first and second water caps 101, 102 are additionally attached respectively to attached portions of the first and second pivot holders 12, 14. Therefore, each water cap 101, 102 can be commonly used for another pivot holder that includes an attached portion having the same shape as the attached portion of the first and second pivot holders 12, 14, even when the pivot holder excluding the attached portion has a different shape.

Furthermore, the water caps 101, 102 can be formed of a material different from a material forming the pivot holders 12, 14. Preferably, the water caps 101, 102 can be formed of resin, rubber and elastomer, so that the water caps 101, 102 can be reduced in weight. Besides, manufacturing cost of the water caps 101, 102 can be also reduced. In this case, the water caps 101, 102 can be deformed when the water caps 101, 102 are arranged in the vicinity of the vehicular body, specifically in the vicinity of the pivot holes, and the water caps 101, 102 interferes with the vehicular body. Therefore, arrangement of the water caps 101, 102 can be more freely determined.

Third Embodiment

Figure 6:
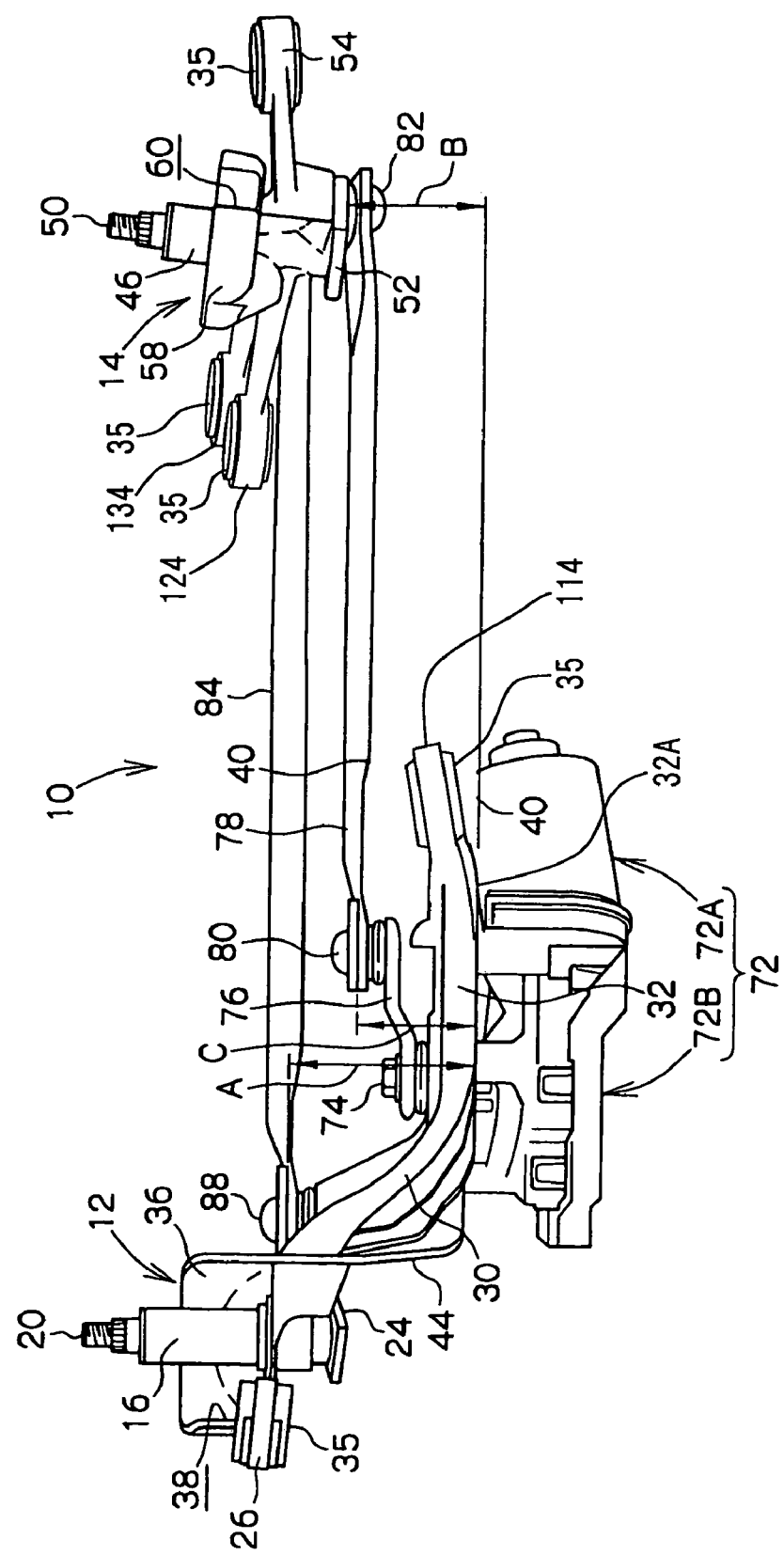
FIG. 6 is a side view showing a wiper device according to a third embodiment of the present invention.
Figure 7:
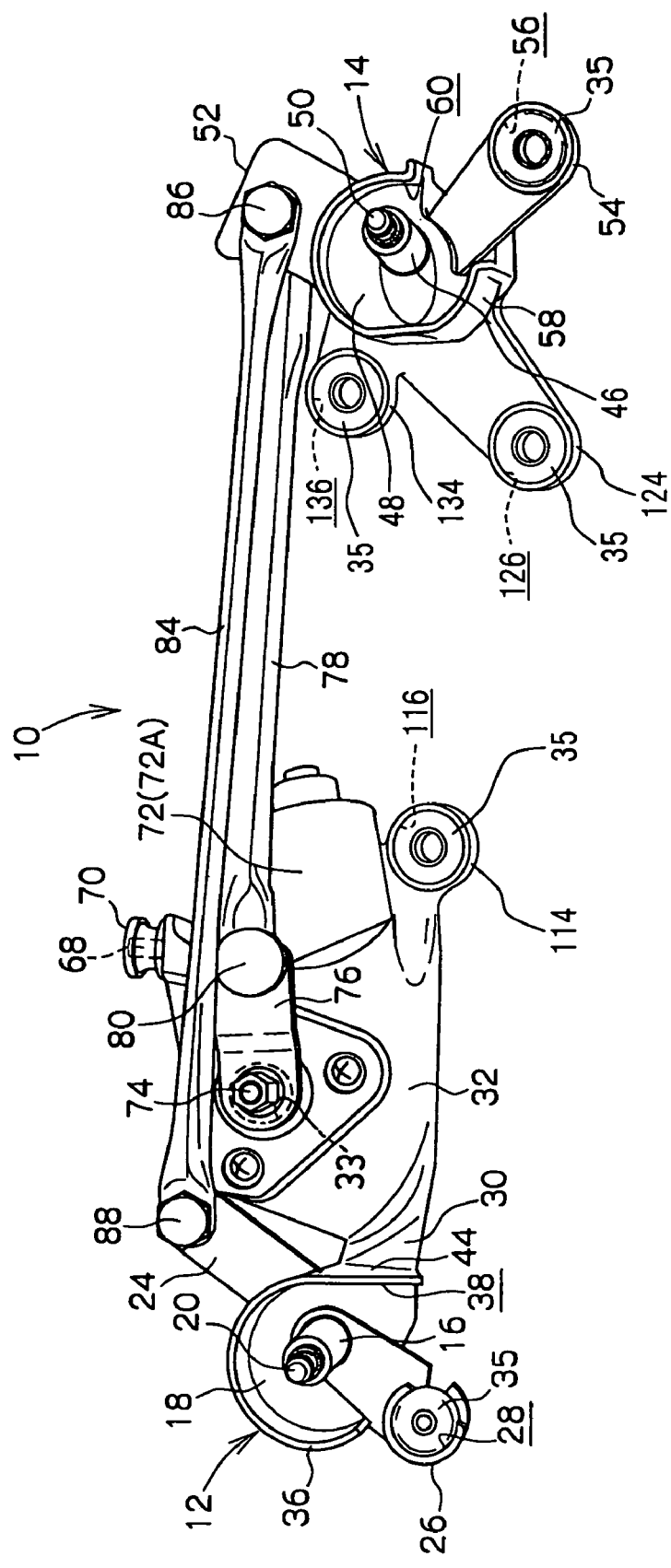
FIG. 7 is a top view showing the wiper device according to the third embodiment.

As shown in FIGS. 6 and 7 in the wiper device 10 of this embodiment, the first and second pivot holders 12, 14 are not connected with each other via a frame member. Specifically in this embodiment, the frame member 42, the first connecting portion 34 of the motor bracket portion 32, and the second connecting portion 62 of the second pivot holder 14 are omitted from the wiper device 10 in the first embodiment.

The first pivot holder 12 has a fixing portion (first fixing portion) 114 having a mounting hole 116, into which a rubber grommet 35 is inserted, in addition to the fixing portion 26. The second pivot holder 14 has fixing portions (second fixing portions) 124, 134 respectively having mounting holes 28, 56, into which rubber grommets 35 are respectively inserted, in addition to the fixing portion 54.

Mounting bolts are inserted into the rubber grommets 35, which are respectively provided in the mounting holes 28,116 of the fixing portions 26, 114 of the first pivot holder 12, so that the first pivot holder 12 of the wiper device 10 is screwed to the vehicular body via the rubber grommets 35. Similarly, mounting bolts are inserted into the rubber grommets 35, which are respectively provided in the mounting holes 56, 126, 136 of the fixing portions 54, 124, 134 of the second pivot holder 14, so that the second pivot holder 14 of the wiper device 10 is screwed to the vehicular body via the rubber grommets 35.

Thus, the first and second pivot holders 12, 14 are secured to a lower portion with respect to the windshield of the vehicular body, substantially in the same manner as the wiper device 10 in the first embodiment.

In the structure of this embodiment, the first and second pivot holders 12, 14 are not connected with the frame member 42. However, the first and second pivot holders 12, 14 are respectively screwed to the vehicular body at multiple screwed portions, so that the wiper device 10 can be steadily secured to the vehicular body.

Even in this structure, the distance between the vehicular body and the wiper motor 72 can be sufficiently secured, while the first and second pivot shafts 20, 50 protrude from the vehicular body similarly to the first embodiment, and the same effects as that of the first embodiment can be achieved. Specifically, impact can be sufficiently absorbed by deformation of the vehicular body and impact load applied to the wiper motor 72 can be sufficiently reduced in the case in which a collision occurs to the vehicle.

Furthermore in this structure, the first and second pivot holders 12, 14 are not rigidly connected with each other via a stiff frame member. Therefore, impact can be more effectively absorbed by deformation of the vehicular body, in the case in which a collision occurs to the vehicle.

In this structure, the first and second pivot holders 12, 14 can be individually mounted to the vehicular body before connecting the link structure to the first and second pivot holders 12, 14. Therefore, manufacturing process can be freely predetermined, and one of the first and second pivot holders 12, 14 can be easily replaced when the one of the first and second pivot holders 12, 14 is broken.

Various modifications and alternations may be diversely made to the above embodiments without departing from the spirit of the present invention.

What is claimed is:

1. A vehicular wiper device comprising:
 a wiper motor that has an output shaft;
 a crank arm that is secured to the output shaft;
 a first pivot holder that is secured to a vehicular body, the first pivot holder rotatably supporting a first pivot shaft in which one axial end of the first pivot shaft is secured to a wiper arm;
 a first pivot lever that is secured to the other one of the axial end of the first pivot shaft;
 a second pivot holder that is secured to the vehicular body, the second pivot holder rotatably supporting a second pivot shaft in which one axial end of the second pivot shaft is secured to a wiper arm;
 a second pivot lever that is secured to the other one of the axial end of the second pivot shaft; and
 a link structure that connects among the crank arm, the first pivot lever and the second pivot lever to transmit rotation power of the wiper motor to the first pivot shaft and the second pivot shaft as a back-and-forth motion,
 wherein the first pivot holder includes a motor bracket portion to which the wiper motor is secured,
 the wiper motor is arranged on a side of a rear face of the motor bracket portion that is on a substantially opposite side as the wiper arm with respect to the motor bracket portion,
 the crank arm is arranged on a frontside of the motor bracket portion that is on a substantially opposite side as the wiper motor with respect to the motor bracket portion, and
 the rear face of the motor bracket portion and the first pivot lever of the first pivot shaft are spaced from each other by a distance that is greater than a distance between the rear face of the motor bracket portion and the crank arm in a substantially axial direction of the first pivot shaft.

2. The vehicular wiper device according to claim 1, wherein the motor bracket portion includes a first connecting portion that protrudes from the motor bracket portion to the second pivot holder such that the first connecting portion inclines by a predetermined angle on the frontside with respect to the rear face of the motor bracket portion to which the wiper motor is mounted, and
 the second pivot holder has a second connecting portion that protrudes to the first pivot holder,
 the vehicular wiper device further comprising:
 a frame member that has a bar-shape and connects between the first connecting portion and the second connecting portion.

3. The vehicular wiper device according to claim 1, wherein the link structure includes:
 a first link rod that connects between the crank arm and the second pivot lever of the second pivot shaft; and
 a second link rod that connects between the second pivot lever of the second pivot shaft and the first pivot lever of the first pivot shaft,
 the rear face of the motor bracket portion and the second pivot lever of the second pivot shaft are spaced from each other by a distance that is greater than the distance between the rear face of the motor bracket portion and the crank arm in a substantially axial direction of the first pivot shaft, and
 the rear face of the motor bracket portion and the first pivot lever of the first pivot shaft are spaced from each other by the distance that is greater than the distance between the rear face of the motor bracket portion and the second pivot lever of the second pivot shaft in a substantially axial direction of the first pivot shaft.

4. A vehicular wiper device comprising:
a wiper motor that has an output shaft;
a crank arm that is secured to the output shaft;
a first pivot holder that is secured to a vehicular body, the first pivot holder rotatably supporting a first pivot shaft in which one axial end of the first pivot shaft is secured to a wiper arm;
a first pivot lever that is secured to the other one of the axial end of the first pivot shaft;
a second pivot holder that is secured to the vehicular body, the second pivot holder rotatably supporting a second pivot shaft in which one axial end of the second pivot shaft is secured to a wiper arm;
a second pivot lever that is secured to the other one of the axial end of the second pivot shaft; and
a link structure that connects among the crank arm, the first pivot lever and the second pivot lever to transmit rotation power of the wiper motor to the first pivot shaft and the second pivot shaft as a back-and-forth motion,
wherein the first pivot holder includes:
a first bearing portion that rotatably supports the first pivot shaft;
a tower portion that extends from the first bearing portion to a side of the first pivot lever with respect to the first bearing portion; and
a motor bracket portion that continuously extends from the tower portion such that the wiper motor is secured to the motor bracket portion,
the wiper motor is arranged on a side of a rear face of the motor bracket portion that is on a substantially opposite side as the first bearing portion with respect to the motor bracket portion,
the output shaft penetrates the motor bracket portion, so that the crank arm, which is secured to the output shaft, is arranged on a frontside of the motor bracket portion that is on the same side as the first bearing portion with respect to the motor bracket portion, and
the rear face of the motor bracket portion and the first pivot lever of the first pivot shaft are spaced from each other by a distance that is greater than a distance between the rear face of the motor bracket portion and the crank arm in a substantially axial direction of the first pivot shaft.

5. The vehicular wiper device according to claim 4,
wherein the first pivot holder has a first fixing portion that extends from the first bearing portion in a radial direction of the first bearing portion such that the first pivot holder is secured to a vehicular body via the first fixing portion, and
the second pivot holder has a second fixing portion that extends from the second bearing portion in a radial direction of the second bearing portion such that the second pivot holder is secured to the vehicular body via the second fixing portion.

6. The vehicular wiper device according to claim 4,
wherein the first pivot holder includes a circumferential wall that circumferentially surrounds the first bearing portion such that the circumferential wall and the first bearing portion are separated with a predetermined circumferential space from each other,
the circumferential wall defines an opening that partially opens in the circumferential wall on a substantially opposite side as a direction in which the first pivot lever extends, and
the circumferential wall includes a vertical wall that continuously extends from the circumferential wall to the side of the tower portion in a substantially vertical direction.

7. The vehicular wiper device according to claim 4, further comprising:
at least one water cap that is provided to at least one of the first pivot holder and the second pivot holder,
wherein the water cap includes:
a cylindrical portion that is attached to an outer circumferential periphery of at least one of the first bearing portion and the second bearing portion along an axial direction of at least one of the first pivot shaft and the second pivot shaft;
a circumferential wall portion that extends from the cylindrical portion in a radial direction of the cylindrical portion; and
an outer circumferential portion that extends from a radially outer portion of the circumferential wall portion along a substantially axial direction of at least one of the first pivot shaft and the second pivot shaft,
the circumferential wall portion has a tub portion that partially opens in the circumferential wall portion, and
the tub portion communicates between an inside of the circumferential wall portion and an outside of the circumferential wall portion with each other in a radial direction of the cylindrical portion.

8. A vehicular wiper device comprising:
a wiper motor that has an output shaft;
a crank arm that is secured to the output shaft;
a first pivot holder that is secured to a vehicular body, the first pivot holder rotatably supporting a first pivot shaft in which one axial end of the first pivot shaft is secured to a wiper arm;
a first pivot lever that is secured to the other one of the axial end of the first pivot shaft;
a second pivot holder that is secured to the vehicular body, the second pivot holder rotatably supporting a second pivot shaft in which one axial end of the second pivot shaft is secured to a wiper arm;
a second pivot lever that is secured to the other one of the axial end of the second pivot shaft;
a frame member that connects the first pivot holder and the second pivot holder with each other; and
a link structure that connects among the crank arm, the first pivot lever and the second pivot lever to transmit rotation power of the wiper motor to the first pivot shaft and the second pivot shaft as a back-and-forth motion,
wherein the first pivot holder includes:
a first bearing portion that rotatably supports the first pivot shaft;
a tower portion that extends from the first bearing portion to a side of the first pivot lever with respect to the first bearing portion; and
a motor bracket portion that continuously extends from the tower portion such that the wiper motor is secured to the motor bracket portion, the motor bracket portion connecting with the second pivot holder via the frame member,
the wiper motor is arranged on a side of a rear face of the motor bracket portion that is on a substantially opposite side as the first bearing portion with respect to the motor bracket portion,
the output shaft penetrates the motor bracket portion, so that the crank arm, which is secured to the output shaft, is arranged on a frontside of the motor bracket portion that is on the same side as the first bearing portion with respect to the motor bracket portion, and the rear face of the motor bracket portion and the first pivot lever of the first pivot shaft are spaced from each other by a distance that is greater than a distance between the rear face of the motor bracket portion and the crank arm in a substantially axial direction of the first pivot shaft.

9. The vehicular wiper device according to claim 8, wherein the motor bracket portion includes a first connecting portion that protrudes from the motor bracket portion to the second pivot holder such that the first connecting portion inclines by a predetermined angle on the frontside with respect to the rear face of the motor bracket portion to which the wiper motor is mounted, the second pivot holder has a second connecting portion that protrudes to the first pivot holder, and the frame member has a bar shape and connects the first connecting portion and the second connecting portion with each other.

* * * * *